(12) United States Patent
Park

(10) Patent No.: US 11,046,247 B1
(45) Date of Patent: Jun. 29, 2021

(54) SYSTEM AND METHOD FOR PREDICTING EFFECTS OF FORWARD GLANCE DURATIONS ON LATENT HAZARD DETECTION

(71) Applicant: North Carolina A&T State University, Greensboro, NC (US)

(72) Inventor: Hyoshin Park, Greensboro, NC (US)

(73) Assignee: North Carolina A&T State University, Greensboro, NC (US)

( * ) Notice: Subject to any disclaimer, the term of this patent is extended or adjusted under 35 U.S.C. 154(b) by 125 days.

(21) Appl. No.: 16/244,758

(22) Filed: Jan. 10, 2019

Related U.S. Application Data

(60) Provisional application No. 62/615,795, filed on Jan. 10, 2018.

(51) Int. Cl.
 *B60Q 9/00* (2006.01)
 *G06K 9/00* (2006.01)

(52) U.S. Cl.
 CPC ......... *B60Q 9/008* (2013.01); *G06K 9/00597* (2013.01)

(58) Field of Classification Search
 CPC .................. B60Q 9/008; G06K 9/00597
 See application file for complete search history.

(56) References Cited

U.S. PATENT DOCUMENTS

| | | | | |
|---|---|---|---|---|
| 8,686,852 | B2 * | 4/2014 | Ben-Dayan | G08B 21/0261 340/539.13 |
| 8,972,076 | B2 * | 3/2015 | Ogawa | G08G 1/096725 701/1 |
| 9,143,400 | B1 * | 9/2015 | Roskind | H04L 61/2007 |
| 9,248,834 | B1 * | 2/2016 | Ferguson | G05D 1/0088 |
| 9,580,012 | B2 * | 2/2017 | Lisseman | B60K 37/06 |
| 9,701,307 | B1 * | 7/2017 | Newman | B60W 10/184 |
| 9,846,999 | B1 * | 12/2017 | Pickover | G06K 9/00664 |
| 10,176,524 | B1 * | 1/2019 | Brandmaier | G06Q 40/08 |

(Continued)

OTHER PUBLICATIONS

Adamczyk, P.D. and Bailey, B.P., Apr. 2004. If not now, when?: the effects of interruption at different moments within task execution. In Proceedings of the SIGCHI conference on Human factors in computing systems (pp. 271-278). ACM.

(Continued)

*Primary Examiner* — Mia M Thomas
(74) *Attorney, Agent, or Firm* — Fox Rothschild LLP

(57) ABSTRACT

A system and method for determining a probability that a driver will detect a hazard while driving. An eye tracker tracks the driver's forward and non-forward glance durations. A probability calculator categorizes the glance durations into an observation type and selects a transition matrix specific to that observation type. The probability calculator groups the glance durations and observation type into a tuple and calculates a probability that the driver will detect a hazard in the current time segment based on the tuple, the previous time segment's detection state, and the transition matrix. Based on whether the determined probability is above or below a threshold, the current time segment detection state is stored in memory as a detect state (driver is likely to detect a hazard) or a non-detect state (driver is not likely to detect a hazard). The driver is alerted if determined to be in a non-detect state.

6 Claims, 10 Drawing Sheets

(56) References Cited

U.S. PATENT DOCUMENTS

| | | | | |
|---|---|---|---|---|
| 2011/0021213 | A1* | 1/2011 | Carr | H04B 5/0031 |
| | | | | 455/456.4 |
| 2012/0176232 | A1* | 7/2012 | Bantz | G07C 5/008 |
| | | | | 340/439 |
| 2013/0145065 | A1* | 6/2013 | Ricci | B60K 37/02 |
| | | | | 710/241 |
| 2013/0303143 | A1* | 11/2013 | Schrader | H04W 12/0804 |
| | | | | 455/418 |
| 2014/0306826 | A1* | 10/2014 | Ricci | G06F 3/013 |
| | | | | 340/573.1 |
| 2014/0310031 | A1* | 10/2014 | Ricci | H04W 36/34 |
| | | | | 705/5 |
| 2014/0313330 | A1* | 10/2014 | Carey | G06K 9/00778 |
| | | | | 348/143 |
| 2014/0375810 | A1* | 12/2014 | Rodriguez | B60Q 1/50 |
| | | | | 348/148 |
| 2015/0178578 | A1* | 6/2015 | Hampiholi | G08G 1/205 |
| | | | | 348/149 |
| 2016/0176338 | A1* | 6/2016 | Husted | B60Q 9/008 |
| | | | | 340/435 |
| 2018/0075309 | A1* | 3/2018 | Sathyanarayana | G05D 1/0055 |
| 2020/0058218 | A1* | 2/2020 | Julian | G08G 1/0125 |
| 2020/0225673 | A1* | 7/2020 | Ebrahimi Afrouzi | |
| | | | | G05D 1/0214 |

OTHER PUBLICATIONS

Ahlstrom, C., Kircher, K. and Kircher, A., 2013. A gaze-based driver distraction warning system and its effect on visual behavior. IEEE Transactions on Intelligent Transportation Systems, 14(2), pp. 965-973.

Guédon, Y., 2003. Estimating hidden semi-Markov chains from discrete sequences. Journal of Computational and Graphical Statistics, 12(3), pp. 604-639.

Klauer, S.G., Dingus, T.A., Neale, V.L., Sudweeks, J.D. and Ramsey, D.J., 2006. The impact of driver inattention on near-crash/crash risk: An analysis using the 100-car naturalistic driving study data. HS 810 594. NHTSA, U.S. Department of Transportation.

Liang, Y., J. Lee, and L. Yekhshatyan. How Dangerous Is Looking Away from the Road? Algorithms Predict Crash Risk from Glance Patterns in Naturalistic Driving. Human Factors: The Journal of the Human Factors and Ergonomics Society, vol. 54, No. 6, 2012, pp. 1104-1116.

Samuel, S. and Fisher, D.L., 2015. Evaluation of the minimum forward roadway glance duration. Transportation Research Record, 2518(1), pp. 9-17.

Samuel, S., Zafian, T., Borowsky, A., Romoser, M.R. and Fisher, D.L., 2013. Can young drivers learn to anticipate hidden hazards: a driving simulator study.

Schwarz, C., Brown, T., Lee, J., Gaspar, J. and Kang, J., 2016. The detection of visual distraction using vehicle and driver-based sensors (No. 2016-01-0114). SAE Technical Paper.

Horrey, W.J. and Wickens, C.D., 2007. In-vehicle glance duration: distributions, tails, and model of crash risk. Transportation Research Record, 2018(1), pp. 22-28.

Louw, T., Madigan, R., Carsten, O. and Merat, N., 2017. Were they in the loop during automated driving? Links between visual attention and crash potential. Injury prevention, 23(4), pp. 281-286.

* cited by examiner

FIGURE 3. Simulator Screen for Visual Search Task

FIGURE 4. Proposed Micro-benchmark Approach for Modeling Effects of Forward Roadway Glance Durations on Latent Hazard Detection FIGURE 5. Hidden Markov Models to explain detection likelihood in time series.

FIGURE 6. The performance test for each scenario type

FIGURE 7. Proportion of detection likelihood for each scenario

FIGURE 8. Detection likelihood in each sequence that has different orders

FIGURE 9. Application of the Model on an Intersection Scenario

SYSTEM AND METHOD FOR PREDICTING EFFECTS OF FORWARD GLANCE DURATIONS ON LATENT HAZARD DETECTION

RELATED APPLICATIONS AND CLAIM OF PRIORITY

This patent document claims priority to U.S. provisional application No. 62/615,795, filed Jan. 10, 2018, the disclosure of which is hereby incorporated by reference in full.

BACKGROUND

Many vehicle accidents are caused by distracted driving. This is becoming increasingly problematic because of rapid advances in in-vehicle infotainment systems and partially automated intelligent transportation systems. For example, drivers may be distracted by in-vehicle features such as stereo, navigation, and HVAC systems, or drivers may be distracted by other passengers in the vehicle and articles like cell phones. With the increased demands on attention processing resulting from multi-tasking while driving, understanding distractions and the limits of attention on driving is a priority.

Distractions caused by performance of secondary, in-vehicle tasks increase the likelihood of a vehicle crash because these tasks take the driver's eyes off the road ahead, thereby impairing the driver's ability to detect threats. Additionally, complex in-vehicle tasks, such as texting, require the driver to alternate its glances between the inside of the vehicle and the forward roadway multiple times during the task (i.e., an "alternating sequence" of glances). While prior art systems have addressed determining the thresholds of off-road and on-road (forward looking) driver glances that are critical to latent hazard detection, nothing in the art teaches a system or method for predicting the probability of hazard detection in a time series, considering all possible forward glance durations within an alternating sequence between off-road and on-road glances. Additionally, nothing in the prior art teaches or suggests taking into account spillover. Spillover is the effect of a secondary, in-vehicle task spilling over into the primary driving task. For example, the cognitive load imposed on a driver by an in-vehicle task (e.g., reading a text message) may spill over to the driver's ability to process information even as he or she is looking forward at the roadway after just performing the secondary, in-vehicle task. Nothing in the prior art teaches considering the duration spent one state (e.g., performing a secondary task) before transition to the next state (e.g., the primary task of driving) as a means for estimating the likelihood that the driver will detect roadway hazards.

SUMMARY

A method for determining a probability that a driver will detect a hazard while driving, including the steps of detecting and tracking the driver's sequence of forward glance durations and non-forward glance durations within a current time segment, categorizing the sequence of forward glance durations and non-forward glance durations into a class of distracting task from a group of at least two classes of distracting tasks, grouping the duration of forward glance durations, duration of non-forward glance durations, and the class of distracting task into a tuple, collecting a sequence of tuples in the current time segment, retrieving from a memory a probability of the driver detecting the hazard in a preceding time segment, estimating the probability that the driver will detect the hazard in the present time segment based on the sequence of tuples and probability of the driver detecting the hazard in a preceding time segment, determining whether the probability of the driver detecting the hazard in a current time segment is below a predetermined threshold, and alerting the driver if the probability of the driver detecting the hazard in a preceding time segment is below the predetermined threshold.

The method may additionally include the step of retrieving from a memory a transition matrix including data on a change from the probability of the driver detecting the hazard in the preceding time segment to the probability of the driver detecting the hazard in the current time segment, such that the estimating step estimates the probability that the driver will detect the hazard in the present time segment based on the sequence of tuples, probability of the driver detecting the hazard in a preceding time segment, and the transition matrix. Differing transition matrices may be applied to differing predetermined hazard scenarios.

A system is provided that determines a probability that a driver will detect a hazard while driving. The system includes an eye tracker that detects and tracks the driver's sequence of forward glance durations and non-forward glance durations within a current time segment, a vehicle data collector that detects and tracks vehicle data, a probability calculator that categorizes the sequence of forward glance durations and non-forward glance durations into a class of distracting task from a group of at least two classes of distracting tasks, groups the duration of forward glance durations, duration of non-forward glance durations, and the class of distracting task into a tuple, collects a sequence of tuples in the current time segment, retrieves from a memory a probability of the driver detecting the hazard in a preceding time segment, estimates the probability that the driver will detect the hazard in the present time segment based on the sequence of tuples and probability of the driver detecting the hazard in a preceding time segment, and determines whether the probability of the driver detecting the hazard in a current time segment is below a predetermined threshold. The system additionally includes a vehicle alarm that alerts the driver if the probability of the driver detecting the hazard in a preceding time segment is below the predetermined threshold.

DETAILED DESCRIPTION

Figure 1:
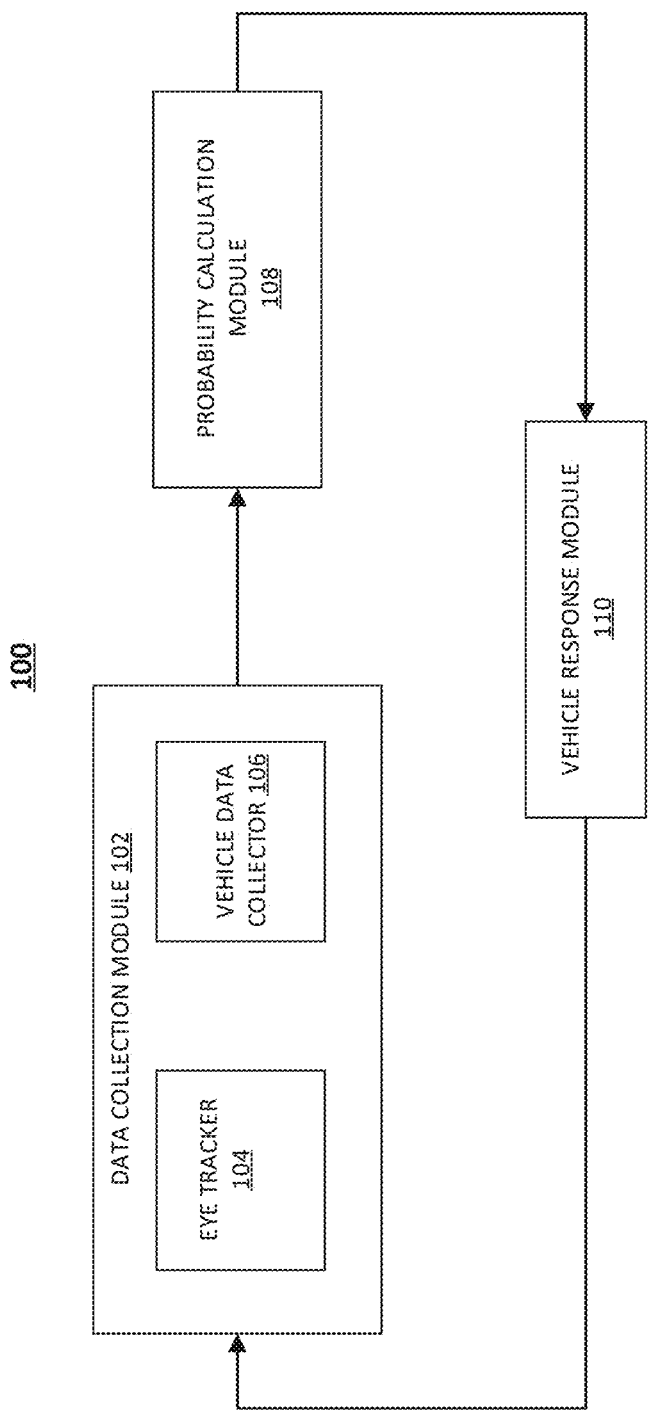
FIG. 1 is a block diagram of the system of the present disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as onboard vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion below, a client device, server device, virtual machine or container may be referred to simply as a "device" for brevity. Additional elements that may be included in electronic devices will be discussed below.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the term "imaging device" refers generally to a hardware sensor that is configured to acquire digital images. An imaging device may capture still and/or video images, and optionally may be used for other imagery-related applications. For example, an imaging device can be held by a user such as a DSLR (digital single lens reflex) camera, cell phone camera, or video camera. The imaging device may be part of an image capturing system that includes other hardware components. For example, an imaging device can be mounted on an accessory such as a monopod or tripod. The imaging device can also be mounted on a transporting vehicle such as an aerial drone, a robotic vehicle, or on a piloted aircraft such as a plane or helicopter having a transceiver that can send captured digital images to, and receive commands from, other components of the system.

Figure 2:
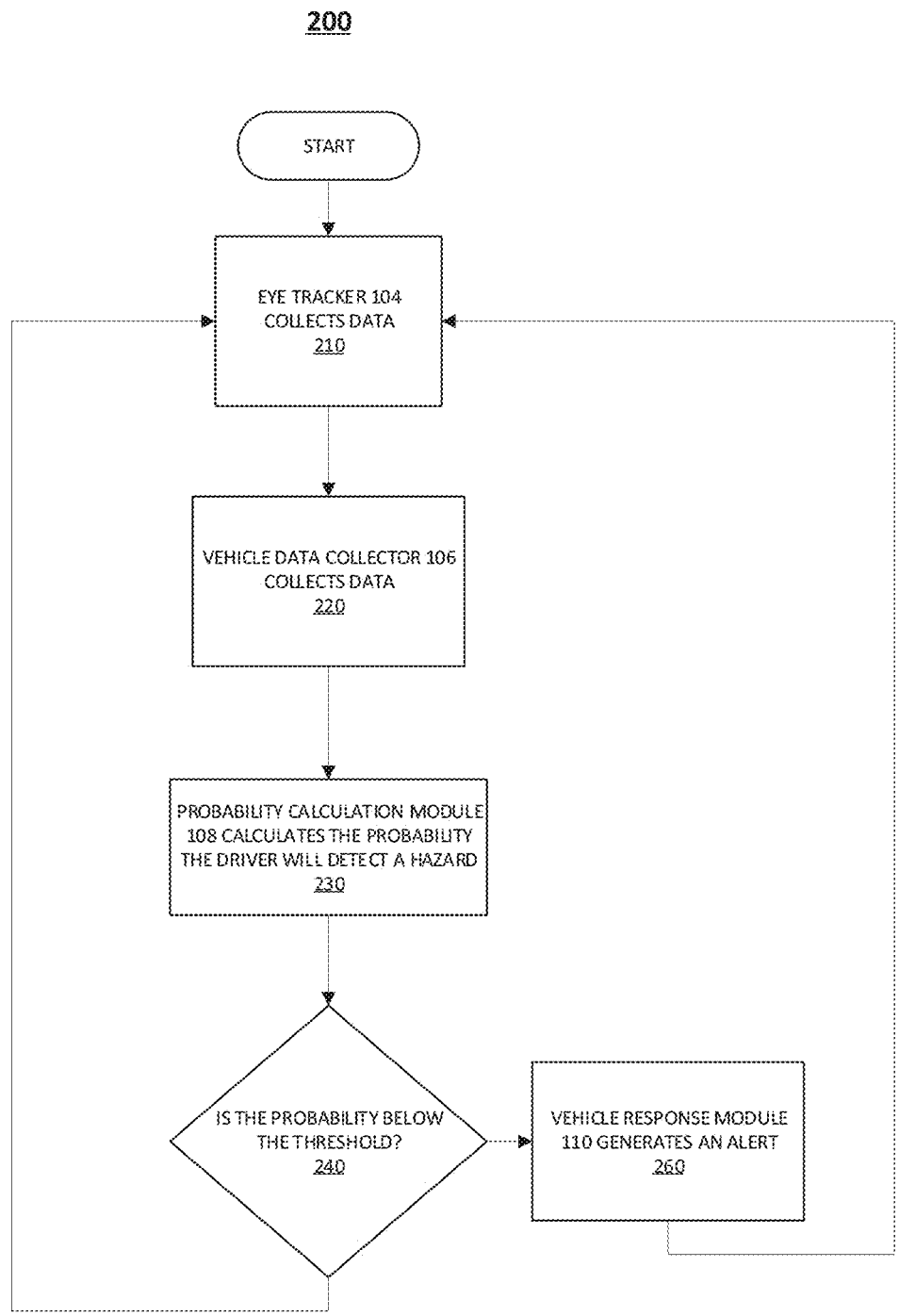
FIG. 2 is a flowchart of the method of the present disclosure.

Referring now to FIGS. 1 and 2, a system 100 and method 200 for predicting the effects of forward glance durations on latent hazard detection are provided. A data collection module 102 collects data pertaining to the driver's eye movements, the vehicle, and the scene ahead. More specifically, an eye tracker 104 is provided, which includes hardware designed for collecting and tracking a driver's eye movement data, including on-road and off-road glances and the durations and sequences of the same (step 210). The eye tracker 104 may be portable and lightweight, such as glasses or goggles that include an imaging device for viewing the driver's eye, an imaging device for viewing the scene ahead, an ultraviolet light source, and a small spectacle to allow the eye imaging device to record an image of the eye without being directly in front of the driver's eye. Exemplary eye tracker glasses include those sold under the brand name ASL Mobil Eye-5 Glasses. The eye tracker 104 may record the eye movement and scene ahead at 60 Hz with an eye accuracy of at least 0.5 degrees of visual angle.

The eye tracker 104 may additionally use the tracked eye movements of the driver to distinguish between and identify classes or levels of distracting tasks (i.e., cognitive workloads), as disclosed in the attached article entitled "Using eye tracking to distinguish between levels of cognitive workload," which is incorporated by reference herein. Specifically, the eye tracker 104 may compare the tracked glance data to eye behavior activity stored in a memory that has been shown to distinguish between cognitive states. Examples of such classes/levels of distracting tasks may include: a baseline task (e.g., quick maneuver to change the radio station to a preset channel); low-load task (e.g., a maneuver to scroll through radio stations until selecting the desired station); and a high-load task (e.g. texting). Any number of classes of distracting tasks may be identified. The images from the cameras in the eye tracker 104 are interleaved and recorded on a remote system, thereby ensuring no loss of resolution. The interleaved video can then be transferred to a computer onboard the vehicle for processing.

A vehicle data collector 106 collects data pertaining to the status of the vehicle such as velocity (step 220). The vehicle data collector 106 may additionally collect information collected by one or more imaging devices on the vehicle that record the scene ahead including the vehicle's lane position and upcoming obstacles such as a pedestrian crossing the street or a vehicle stopped ahead. The cameras may additionally collect information about the upcoming roadway, including curves, traffic circles, and intersections. All of the data collected in the data collection module 106 may be segmented into consecutive or overlapping timeframes.

The probability calculation module 108 calculates the probability that a driver will detect a hazardous condition in the roadway ahead (step 230) using data collected by the data collection module 102. Specifically, the probability calculation module 108 processes eye, vehicle, and road data from the data collection module 102 for the corresponding timeframe, including the corresponding class of the distracting task as detected by the eye tracker 104. The probability calculation module 108 groups the duration the driver is not engaging in forward glances, the duration in which the driver is engaged in forward glances, and the distracting task class into a tuple. A collection of tuples may be collected in a fixed time stage.

The probability calculation module 108 may also retrieve from a memory a transition matrix that includes the transition probability of the driver detecting a hazard from the previous timeframe to the then-current timeframe. The probability calculation module 108 estimates the probability that the driver will detect the hazard in the current timeframe ("present probability") based on the collection of tuples, the probability of the driver detecting the hazard in the previous timeframe in the given set of tuples, and the transition matrix. The probability calculation module 108 utilizes Markov and hidden Markov mathematical models to arrive at the present probability of hazard detection by considering the duration of forward glances within an alternating sequence of glances, as explained further below. The Markov and hidden Markov models as implemented in the probability calculator 108 may also account for varying probabilities based on preconfigured vehicle scenes that may be detected by the data collection module 102, such as a pedestrian crossing the street, a vehicle stopped ahead, and upcoming road conditions including curves, traffic circles, and intersections.

If the present probability of hazard detection is below a predetermined threshold (step 240), a vehicle response module 110 alerts the driver accordingly (step 260). Such alerts may be in the form of audible, visual, and physical alerts such as a voice warning, beep, blinking lights in the dashboard, or vibrating seats, all of which are intended to get the attention of the driver. The entire process of the data collection module 102 collecting data about the driver and the road, and the probability calculation module 108 using the previous timeframe's probability to calculate the current timeframe's probability, then repeats.

As referenced above, the probability calculation module 108 utilizes Markov and hidden Markov mathematical models to arrive at the present probability of hazard detection by considering the duration of forward glances within an alternating sequence of glances. The derivation and implementation of such mathematical models are explained in "Modeling Effects of Forward Glance Durations On Latent Hazard Detection," which is incorporated by reference herein. Excerpts from such article are as follows:

To determine the minimum forward roadway duration to adequately anticipate hazards, 45 drivers were asked to navigate 8 unique virtual scenarios on a driving simulator, while alternating their glances inside (2 s) and outside (either 1 s, 2 s, 3 s, or 4 s) the vehicle in a uniform sequence (consistent on-road and off-road durations). A micro-benchmark approach based on Hidden Markov Models is explored to infer the transition probability of hazard detection that changes dynamically between the detection and non-detection stages. The model is cross-validated, and demonstrated to be accurate and robust. Three different characteristics of total sequence time were tested in the model. Using the ground truth transition probability from fixed forward glance duration, the probability of hazard detection with variable forward glance duration within an alternation sequence was computed. Across non-uniform alternation sequences, different permutations of sequences show that a short time-series of alternation (10 s) of glance behavior is sufficient for hazard detection (greater than 50.0%). Appropriate countermeasures can be developed to increase a driver's forward glance duration whenever the detection probability is predicted low.

Using eye tracking, glance data was collected and the minimum forward glance duration within an alternation sequence critical to hazard detection was determined. The decrease in hazard detection during shorter roadway durations was a consequence of the driver having to devote more resources to processing information. Although this approach has merit for providing the minimum threshold of forward duration towards National Highway Traffic Safety Administration (NHTSA)'s Driver Distraction Guidelines, it does not fully explain the transition of the driver's hazard detection probability between stages. In this work, each task in the alternation sequence belongs to a discrete stage. The hazard detection likelihood in the next stage depends on the alternation sequence in the current stage. The conditional probability of hazard detection in the next stage is estimated given the current stage's different task. The various combinations of alternation sequence differ in the duration of the on-road glance (1 s, 2 s, 3 s or 4 s) within the alternation sequence, while the off-road glance is fixed to 2 s. The driver's attention level in the next stage is expected be high when the current stage's task has a fairly long on-road glance so that the driver can return his/her glance towards the forward safely, where 'safe' is characterized by drivers' ability to anticipate latent threats. The previous studies presented the impact of both on-road and off-road glance duration on drivers' hazard detection, but neglected three essential properties and the present disclosure will make contributions in overcoming these issues. First, ignoring the stochastic process between stages may lead to underestimation or overestimation of the detection likelihood. Glances away from, and toward the forward roadway occur alternation sequences in a time-series. The combination of the alternating tasks cause variation in the level of detection likelihood over time. As shown in the estimation of driver distraction, potential distractions marked by a real-time attention buffer of a maximum level of 2 s, starts decreasing when the driver looks away, and the buffer starts filling up when the gaze direction is directed toward the forward roadway. It is assumed that the latent hazard detection in discrete time stages has some stage-wise dependencies. Alternation sequences of various cognitive loads, i.e., no load or low load (switching effect), and attentional processing, i.e., top down or bottom up, are considered. With the same future forward glance duration within an alternation sequence, prior higher load distraction with shorter duration may result in lower detection rate than when the roadway is continuously visible.

Second, the algorithms incorporating concurrent off-road glance duration predicted crash risk better than did the algorithms incorporating glance history. In a short period, the hazard detection likelihood in the next stage heavily depends on the detection likelihood in the current stage, instead of the complete sequence history (e.g., 30 seconds ago). In this disclosure, the current state encapsulates everything sufficient and necessary to predict the future detection. A chain of linked hazard detection likelihood is presented such that, what happens next depends only on the current detection state of the system. The significance of more recent stages on predicting the future detection likelihood is presented.

Third, the relationship between the frequency of an alternation sequence and the detection likelihood in a time series has not been studied. For heavy cognitive loads, a driver is more likely to extend the alternation sequence (i.e. complex tasks take longer to complete). This work finds the relationship between duration of alternation sequence and detection likelihoods. A lower frequency alternation sequence with a higher forward glance duration leads to higher detection likelihoods. How long the driver needs to glance at the forward to compensate for more frequent distraction was determined. In summary, it is important to estimate the transition of hazard detection likelihoods between stages, across different cognitive loads and processing requirements. The experiment conducted on the driving simulator provides previous and current observations of forward duration, and latent hazard detection in the current stage. However, hazard detection in the previous stage is not directly observable; therefore, the transition probability and detection states are hidden. Fortunately, Hidden Markov Models can resolve this problem with the following satisfying properties: The current stage's latent detection state (finite number of discrete states) is invisible, and is a function of observed forward duration that is sampled in equally spaced time intervals; and The sequence of states in the hidden process satisfies the Markov property: that is, the detection state at time stage t only depends on the previous state t−1.

Data Methodology.

Forty-five younger drivers between ages 18 and 20 with an average driving experience of 2.3 years were recruited from the University of Massachusetts, Amherst, and surrounding areas as paid volunteers. Participants sat in the fixed-base, full-cab, driving simulator, and operated the controls just like a normal car to help them navigate the virtual world. The simulator had three screens subtending a field of view equivalent to 150 degrees. A monocular, head-mounted, lightweight eye tracker was used to record eye behaviors. The eye tracker had an accuracy within 0.5 degrees of visual angle. Data collected in the experiment include eye movement data, vehicle data recorded from the simulator (velocity and lane position), and task engagement data (task accuracy, percentage tasks attempted etc.) The current effort focuses on the eye movements.

Participants navigated 8 unique virtual scenarios once in the driving simulator. The scenarios used in the experiment have been previously cross-validated and context-validated in several studies. The scenarios each lasted between one to two minutes in duration while the complete experiment averaged approximately forty minutes. The scenarios were orthogonally designed to determine how type of processing and eccentricity (central or peripheral) would affect the forward duration and the associated latent hazard anticipation. The type of processing was either top-down (where attention needs to be allocated to a potential threat to acquire information) or bottom-up (where the processing of information occurs due to attraction by sudden onset via motion or illumination).

The latent hazards examined in the current experiment include: a lead vehicle braking event on a two-lane road, potential cross traffic at a 4-way intersection, potential pedestrian at the left extremity of a midblock crosswalk on a two-lane road, parked truck at a crosswalk with potential pedestrian at the right-end of the crosswalk, obscured curve scenario with vehicle that may back out, a work zone with workers and objects, left turn at 4-way intersection with potential oncoming traffic, and dense vegetation obscuring pedestrians on a right-winding curve.

Participants were given a brief overview at the onset, asked to read an informed consent form, and outfitted with an eye tracker that was calibrated within the simulator given a practice drive to acclimate them with the controls of the driving simulator. The practice drive included no hazard anticipation scenarios to prevent sensitization. Subsequent instructions were provided to participants at the onset of each experimental drive sequence.

The ordering of the scenarios was completely counterbalanced across participants both within, and across groups. The scenarios were administered individually to allow for complete counterbalancing. Each participant only navigated one drive, either under a continuous, a no-load, or a low-load condition. The continuous condition involved participants do not perform any alternation asks in addition to driving. The no-load and low-load conditions both had four sequences each with a single combination of off-road and on-road glance each: [2 s-1 s], [2 s-2 s], [2 s-3 s], or [2 s-4 s]. Participants navigating the no-load and low-load condition were only exposed to one of the four alternation sequences to minimize confounds.

The current study employs a mixed design, where the type of processing and eccentricity are varied within subjects while the alternation sequence and type of load are between-subject factors. Drivers were evaluated across one of three groups and nine conditions (one continuous view group with a single condition, and two groups of alternating views with 4 conditions of baseline and low cognitive load each). Drivers performed simulated in-vehicle tasks requiring seven glances alternating inside (four) and outside (three) the vehicle. The drivers navigated only a single drive (8 scenarios) to minimize learning effects as well as simulator sickness resulting from the prolonged exposure. Drivers in between baseline (no load) and low-load conditions were assigned to one of four secondary tasks. The alternation sequence remained the same for any one participant (fixed glance duration).

Figure 3:
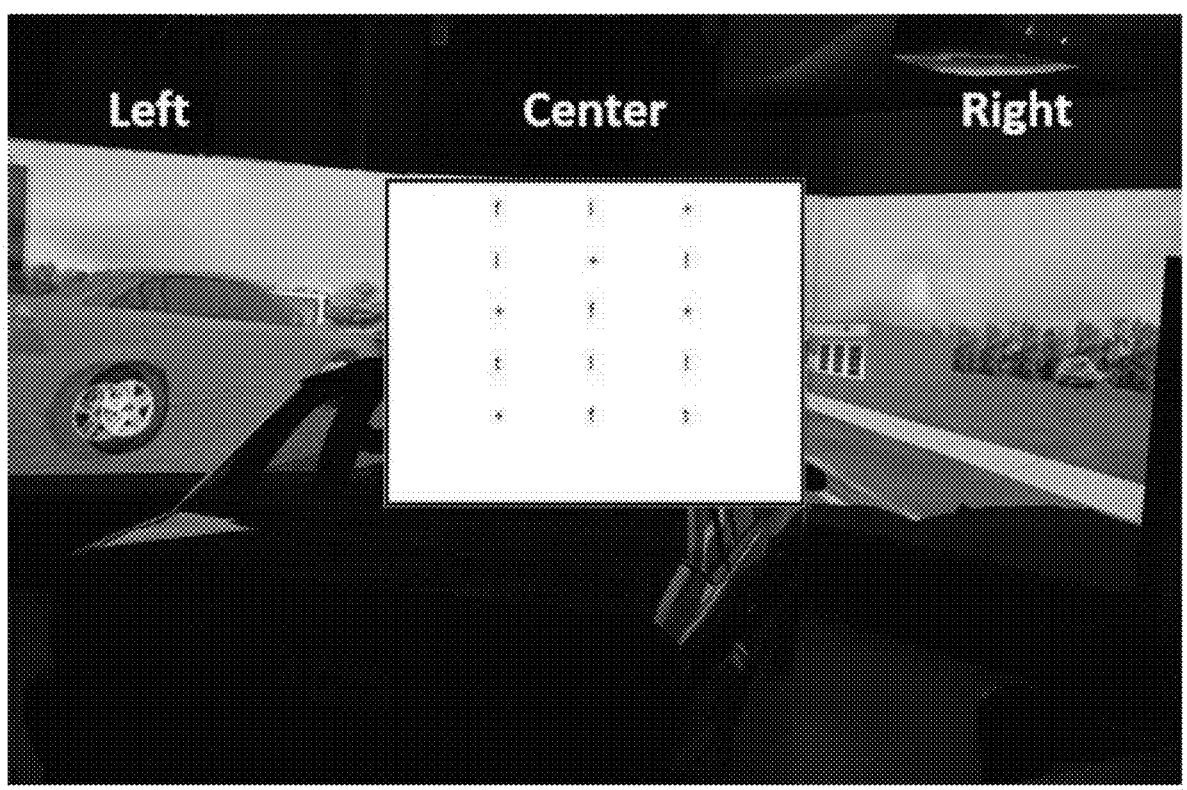
FIG. 3 is a graphic image of a simulator screen for a visual search task in accordance with the present disclosure.
Figure 4:
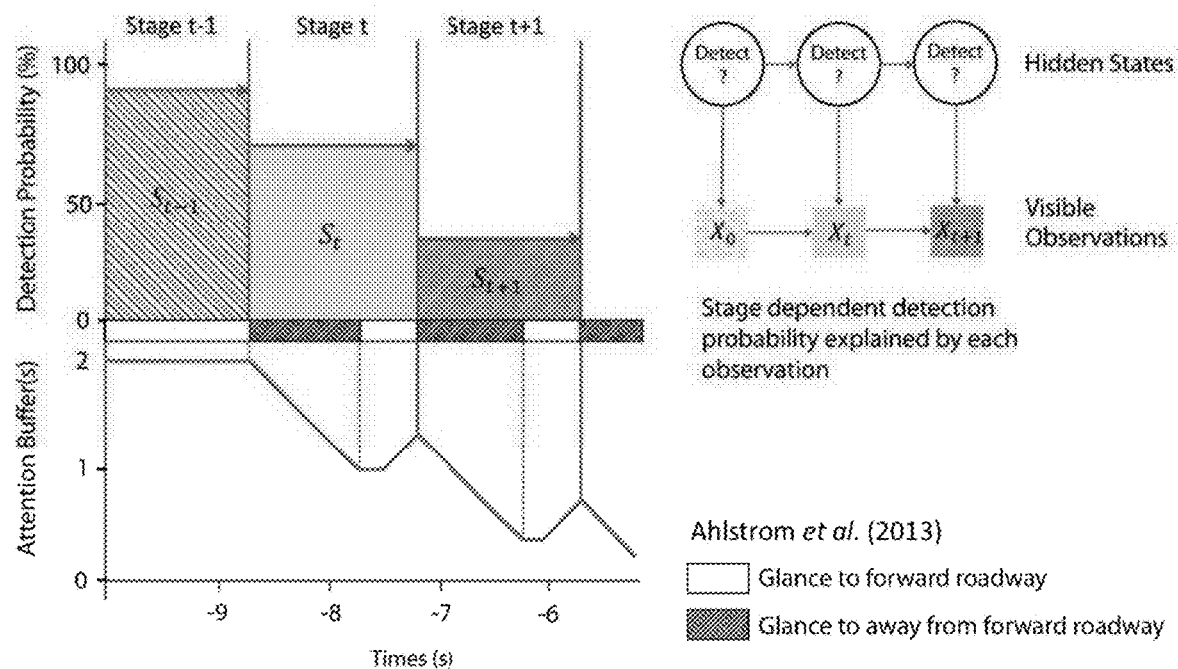
FIG. 4 is a chart of a micro-benchmark approach for modeling effects of forward roadway glance durations on latent hazard detection in accordance with the present disclosure.

The in-vehicle task was simulated on the three-screen simulator with a blank center limited to 2 s (FIG. 3). The simulator center screen was used to display task in a manner that would afford us complete control over how much information the driver can obtain from the roadway. The cognitive load (no load or low load) was manipulated by either presenting a blank screen during the in-vehicle glance or by having participants perform a search task (identify the number of target 't' in a 5×3 matrix) respectively. Between displaying the blank center screen, the forward glance was varied from is to 4 s across subjects. The time when the forward roadway was not displayed on the center screen is referred to as the invisible time. The time when the roadway was displayed on the center screen is referred to as the visible time. Each sequence began and ended with a display of a blank screen or the secondary task. This led to four sequences of invisible and visible times to define a unique drive.

The experiment examined eye data to determine drivers' latent hazard anticipation ability. Drivers' latent hazard anticipation was measured by manually coding participants' glances at target zones when they are in the appropriate launch zone. A launch zone is an area of the roadway where a driver needs to begin scanning for potential threats while the target zone is the region in the roadway from where an impending threat may materialize. Only glances (consistent fixation longer than 300 ms at target area) were considered for determining anticipation, as opposed to singular saccade fixations. Drivers were scored "1" (hit) for a successful glance and "0" (miss) for an unsuccessful glance; where a successful glance is identified as a glance at the target zone when approaching the launch zone in each scenario.

Micro-Benchmark Approach.

In previous studies, due to the constraints over experimental design and control, the fixed duration of forward glances was used for measuring effects on latent hazard detection in an alternating sequence. However, drivers are assumed to increase the accumulated visual time-sharing duration by increasing the number of glances away from the road. As the level of attention increases or decreases with different buffer levels, it is assumed that the level of hazard detection will change with different distraction levels. There is a close relationship between the likelihood of hazard detection and the forward glance via a simulator-based experimental study.

In the micro-benchmark approach, the proposed model is trained and tested on fixed time window (alternation sequences with fixed forward glance duration, e.g. [2 s-1 s, 2 s-1 s, 2 s-1 s, 2 s-1 s] using a k-fold cross validation. Estimated ground truth parameters are used in computing latent hazard detection probabilities on variable glance sequences, e.g. [2 s-1 s, 2 s-2 s, 2 s-3 s, 2 s-1 s].

A stage consists of an invisible state and a visible alternation of tasks (e.g., in-vehicle task and forward duration, [2 s-1 s]) in predefined time intervals. Each stage in square space in FIG. 3 has a probability of latent hazard detection. The proposed Hidden Markov Model (HMM) estimates the probability of state transitions, using visible observations [2 s-1 s].

One such example of HMM application to driving was on the time series estimation on the driver state. The Model was applied to predict the current level of driver distraction by using the historical state and observed steering wheel information. The HMM is applied to predict the probability of latent hazard detection taking into account the duration of forward glances within a sequence, where the driver is alternating his/her glances between the inside of the vehicle and the forward roadway to perform an in-vehicle, secondary task.

Modeling Framework.

The performance of a sequence of alternating glances leaves us with two groups of participants, ones that successfully detected latent hazards and those that did not. These two components of the distribution are characterized by a discrete random variable S that takes the value 0 with an observed participant $X_0$ and takes the value 1 with an observed participant $X_1$ with following mixture of probabilities:

$$S = \begin{cases} 0 \text{ if } p(X_0) \\ 1 \text{ if } p(X_1) = 1 - p(X_0) \end{cases} \quad (1)$$

A sequence of random variables $\{S_t: t \in 0, 1, \ldots, T\}$ takes values in the state space of hazard detection $\{0, \ldots, J\}$. The stochastic detection process has a Markov property (memoryless) if the future state $S_{t+1}$ is independent of its past states $S_{t-1}, S_{t-2}, \ldots, S_1$ with an initial state $S_0$, given the current detection state of the process $S_t$. With a sequence of observations $s_0, \ldots, s_t, s_{t+1}$, the property has conditional probability as following:

$$P(S_{t+1}=s_{t+1}|S_t=s_t, S_{t-1}=s_{t-1}, \ldots, S_0=s_0) = P(S_{t+1}=s_{t+1}|S_t=s_t) \quad (2)$$

A Markov chain has transition probabilities $p_{ij} = P(S_{t+1}=j|S_t=i)$, if the transition probabilities are independent of t. The transition probabilities of a homogeneous J state Markov chain can be summarized in a J×J matrix A with the sum of the entries in any row equal to 1.

$$\sum_{j=1}^{J} p_{ij} = 1 \quad \forall i \quad (3)$$

The long-term behavior of a Markov chain can be presented as matrix A(k) as the $k^{th}$ power of A which contains k-step transition probabilities $p_{ij}(k) := P(S_{t+k}=j|S_t=i)$.

$$A(k) := \begin{pmatrix} p_{11}(k) & \cdots & p_{1J}(k) \\ \vdots & \ddots & \vdots \\ p_{J1}(k) & \cdots & p_{JJ}(k) \end{pmatrix} = A^k k \quad k = 1, \ldots, K \quad (4)$$

Two states (J=2) indicate $p_{11}$ (k) as the probability of a "hazard detection" followed by another successful "hazard detection" and $p_{22}$ (k) as the probability of a "no detection" followed by another "no detection" in a stage k.

Given the probability distribution that the Markov chain will start in initial state $i, \pi_i$, the distribution of the state at time t can be computed as $\pi T^{k-1}$. In this work, the experiment provides ground truth parameters from the fixed forward glance duration. The output detection probability, $\pi_i$, is used as an input to the variable forward glance duration.

Hidden Markov Models.

HMM has a transition matrix A and an initial state $\pi$ to compute a probability of detecting a hazard in a stage. However, there are many scenarios to allow a full combinatorial of different tasks and forward durations for every time stage. The experiment data only provides detection state of the last stage K, and states are assumed to be hidden. To capture invisible detection states (1, ..., K−1), the parameter selection process is driven by an unobserved (i.e. hidden) Markov chain.

Figure 5:
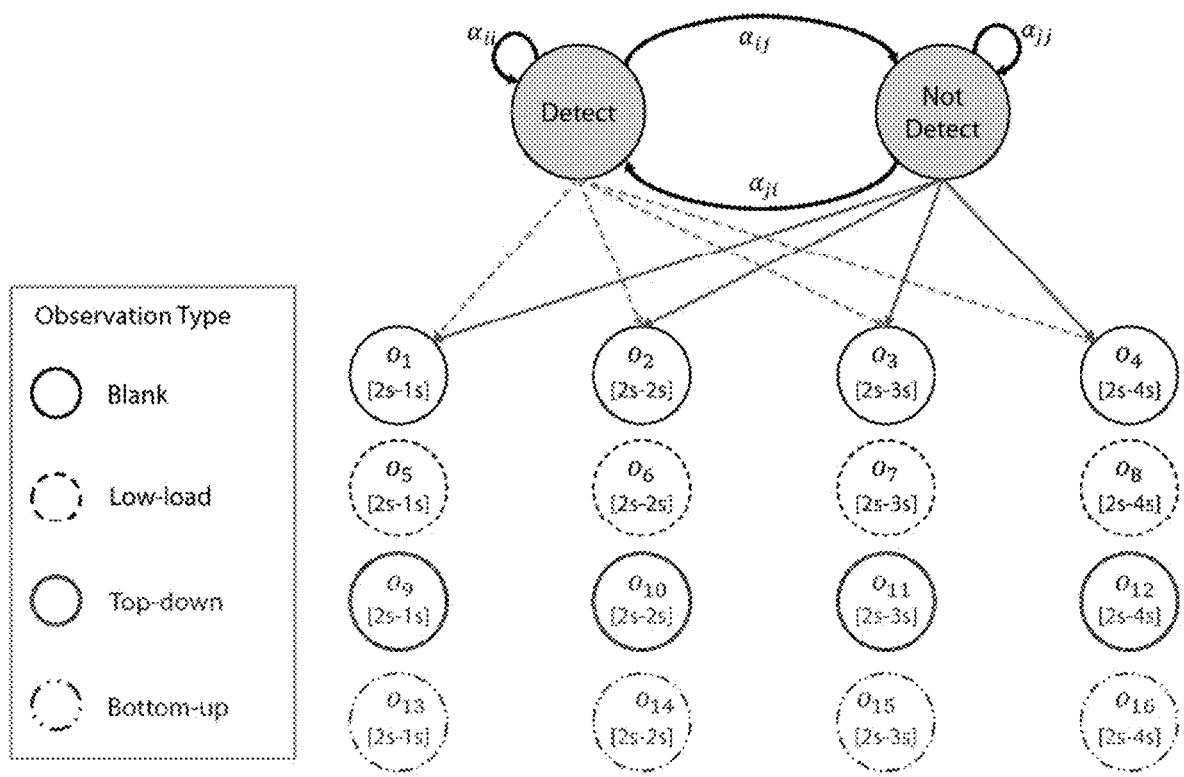
FIG. 5 is a chart of a hidden Markov model showing hazard detection likelihood in a time series in accordance with the present disclosure.

Let $O=o_1, o_2, \ldots, o_T$ denote a sequence of T observations and emission probabilities (FIG. 5). In a sequence of observation likelihoods, $B=b_i(o_t)$ express the probability of an observation $o_t$ being generated from a state i (detect and not detect). Observations ($o_1, o_2, \ldots, o_{16}$) correspond to the each alternation sequence with different forward glance duration, e.g., from [2 s-1 s] to [2 s-4 s], for each type of glances (blank, low load, top down, bottom up). The true state value from the experiment data is used for evaluation of the data.

Parameter Estimation Algorithms.

The estimation of HMM crucially depends on its set of parameters $\lambda=(A, B)$. First, when transition probabilities A and emission probabilities B are given, with known observation sequence O, the forward algorithm computes the likelihood $P(O|\lambda)$ of a particular observation sequence with three steps: Initialization-Recursion-Termination. Each cell of the forward algorithm marks $\alpha_t(j)$ to represent the probability of being in state j after seeing the first t observations given A. The probability of $\alpha_t(j)$ is computed recursively by summing over the extensions of all the paths that lead to the current cell.

$$\alpha_t(j) = \sum_{j=1}^{N} \alpha_{t-1}(i)\alpha_{ij}b_j(o_t); 1 \le j \le N, 1 < t \le T \quad (5)$$

Second, the experiment data on the fixed forward roadway duration does not have A. The Baum Welch algorithm, a special kind of expectation-maximization theory, is used to find the maximum likelihood estimate of the parameters of the HMMs given O. The backward probability β is used as the probability of having the observation from time t+1 to the end, given state j at time t.

$$\beta_t(i) = P(o_t o_{t+1} \ldots o_T | q_t = i\lambda) \quad (6)$$

In the expectation-step, the expected detection state occupancy count γ and the expected detection state transition count ξ are computed. Given the observation sequence, let $\xi_t(i,j)$ be the probability of being in state i at time t and state j at time t+1 and $\gamma_t(i)$ as following:

$$\zeta_t(i, j) = \frac{\alpha_t(j)\alpha_{ij}b_j(o_{t+1})\beta_{t+1}(j)}{\sum_{j=1}^{J}\sum_{j=1}^{J} \alpha_t(j)\alpha_{ij}b_j(o_{t+1})\beta_{t+1}(j)} \quad (7)$$

$$\gamma_t(i) = \sum_{j=1}^{J} \zeta_t(i, j) \quad \forall t, i \quad (8)$$

In the maximization step, $\xi_t(i, j)$ and $\gamma_t(i)$ are used to re-compute new A and B probabilities.

$$\hat{\alpha}_{ij} = \frac{\sum_{t=1}^{T-1} \zeta_t(i, j)}{\sum_{t=1}^{T-1} \gamma_t(i)} \quad (9)$$

$$\hat{b}_j(k) = \frac{\sum_{t=1}^{T} s.t.O_{t=v_k} \gamma_t(j)}{\sum_{t=1}^{T} \gamma_t(j)} \quad (10)$$

where $\hat{a}_{ij}$ and $\hat{b}_j(k)$ are estimated new parameters.

Training Setup.

Fixed duration from the experiment data is trained by Baum Welch algorithm. Following the estimation of $\lambda=(A, B)$, the performance of HMM is tested. An initial probability distribution π for hidden data is used, and the fitted value are used in forward algorithm to calculate the condition of variable durations.

Results.

The developed model clearly interprets the time series influence of the performance of in-vehicle tasks on latent hazard detection. The invisible behavior of critical alternating sequences with different characteristics can be captured. Since this involves a stochastic detection process evolving over time, stages and total experiment time need to be controlled in certain ways. The following three test settings are generated: 1) fixed time window, 2) variable time window (fixed total number of stages), 3) variable time window and variable total number of stages.

Fixed Time Window.

The experiment was set to have the fixed time window (ω=15 s) across all scenarios. The HMM's were trained and tested for each sequence. Each of individual driver on eight scenarios generates 320 sample data. 75% of the data was used to train the model and the remaining 25% was used to run the model and test its performance on data it had not seen before using 4-fold cross validation. Maximum number of iterations is set to 100, and the iteration was terminated if the transition and emission matrices converge. The Baum-Welch algorithm that finds a local maximum of the likelihood function is sensitive to the initial parameter values used. Therefore, a procedure is used to run the algorithm multiple times with different initializations. The authors randomly chose 10 different initial seed parameter sets that are maximized over all runs, and then chose the best one.

Figure 6:
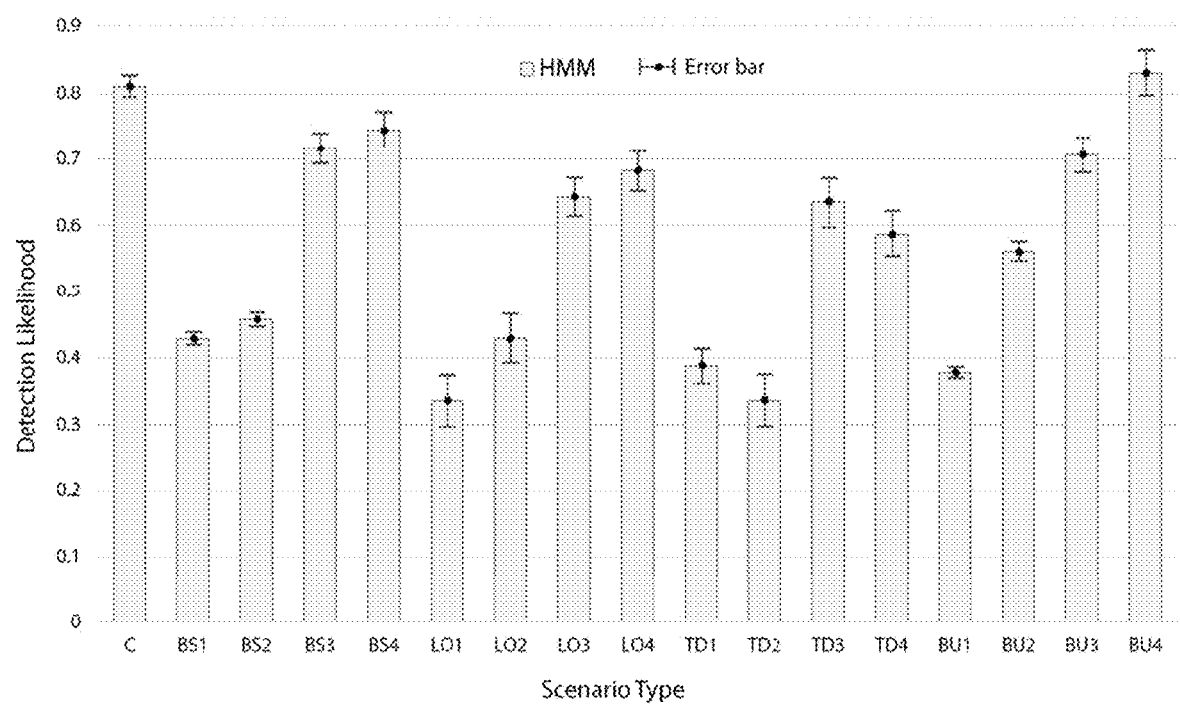
FIG. 6 is a chart of performance tests for hazard scenarios in accordance with the present disclosure.

FIG. 6 presents the result of performance test for each scenario type. Tasks with baseline swapping or no load (BS) for 2 s followed by 1 s forward duration with four times of repetition [2 s-$BS_1$ 2 s-$BS_1$ 2 s-$BS_1$ 2 s-$BS_1$] is presented as $BS_1$. Detection likelihood was computed over the participants who attempted $BS_1$. The predicted likelihood (42.8%) by HMM was lower than the real likelihood (43.8%). Under fixed window of (ω=15 s), other alternation sequences are also tested. Each experiment with standard error bars has 95% confidence intervals as convincing evidence that the treatment has a significant effect.

The HMMs were tested on an 80 data point set using a K-fold cross-validation (i.e., k is 4 different duration types) across the variation in cognitive load (performing an in-vehicle secondary task with no load or low load), or type of processing (top down or bottom up). Each type has four different sequences BS, LO (low-load), TD(top-down), BU(bottom-up) with five participants repeating each sequence. Labeled four sequences measure whether the accuracy of model hazard detection likelihoods is correctly predicted by HMM. After estimating parameter of each duration type, 20 subsets were tested. Table 1 shows the F-measure as the harmonic mean of the probability of correctly labeling the detection (recall) and probability that a positive prediction is correct (precision). The model performance was approximately 89% accurate on average. The fairly balanced trade-off between precision and recall presents the model is robust.

TABLE 1

Result of 4-Fold Cross Validation

| Validation criteria | Four different sequence types (K = 4) | | | |
| --- | --- | --- | --- | --- |
| | Type 1 (BS) | Type 2 (LO) | Type 3 (TD) | Type 4 (BU) |
| Average Accuracy | 95% | 85% | 85% | 90% |
| Recall | 0.95 | 0.94 | 0.89 | 0.90 |
| Precision | 1.00 | 0.89 | 0.94 | 1.00 |
| F value | 0.97 | 0.92 | 0.92 | 0.95 |

The model was further trained and compared against experiment data. The HMM parameters λ=(A, B) were fitted until the detection likelihood of the model and the real value becomes identical. The new estimation λ'=(A', B') serve as the ground truth parameters of the model.

Figure 7:
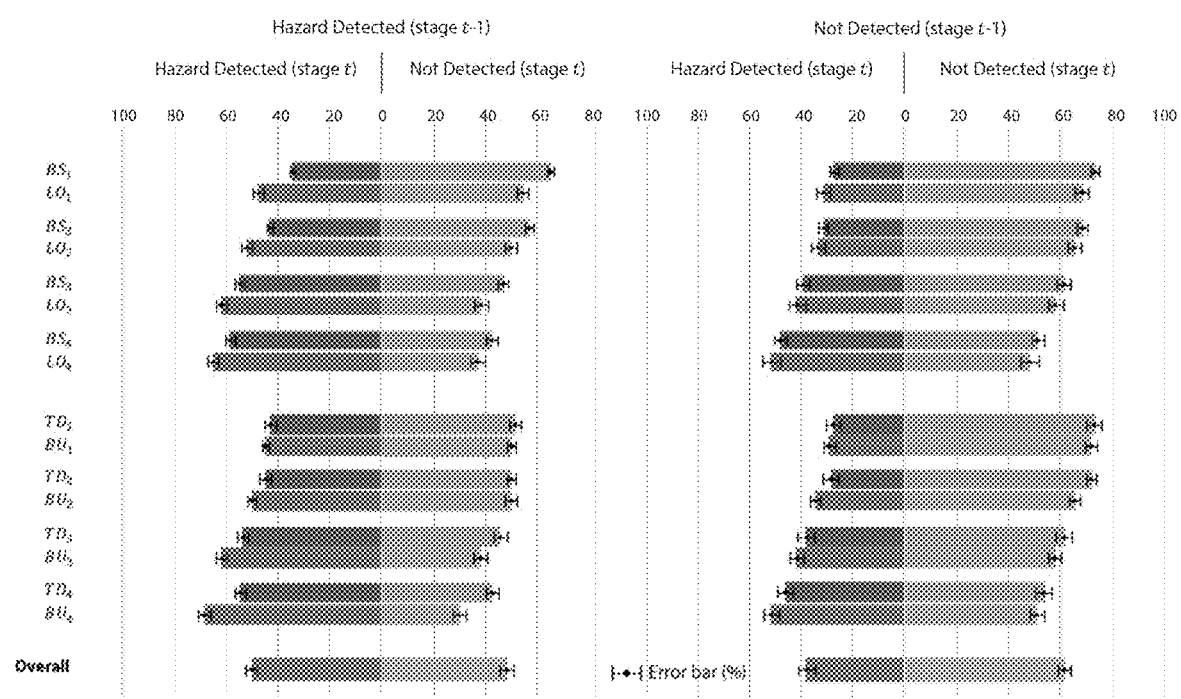
FIG. 7 is a chart of proportions of hazard detection likelihood for hazard scenarios in accordance with the present disclosure.

With corrected HMM, FIG. 7 describes the resulting proportion of successful and unsuccessful detection likelihood and errors for each scenario characterized by effect of load and type of processing. If the hazard was detected in the previous stage, the probability of detecting the hazard in the current stage is 61%.

The average likelihood of current stage detection is higher in baseline (BS) (44%) than low-load (LO) (35%). The trend shows that if the hazard is detected in the current stage, it is more likely to be detected in the second stage. If the hazard is not detected in the current stage, it is more likely to be not-detected in the next stage. On the contrary, the chances of not detecting a hazard again in the next current under unsuccessful detection in the previous stage increase as the glance time on the forward roadway decreases. Bottom-up (BU) hazards are always more easily detected than Top-down (TD) hazards under condition of previous successful detection.

Using the ground truth HMMs, there is a λ' that is required in estimation of the forward path probabilities. In the next section, the forward algorithm is utilized to compute detection probabilities in the forward stages in variable conditions that were not available from experiment data.

Variable Time Window.

To identify the hazard detection behaviors of a potential set of alternation sequences with same tasks in different orders, the frequency of tasks inside and outside of the vehicle is fixed. The window co becomes variable ranging from 12 s to 24 s per scenario.

Figure 8:
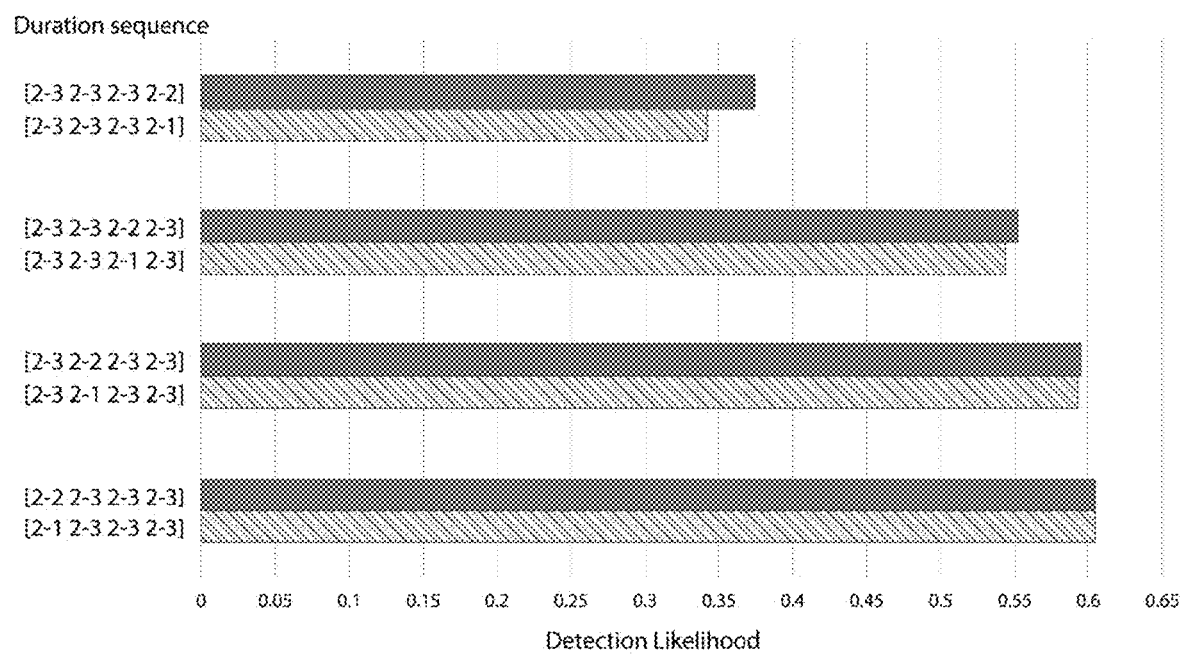
FIG. 8 is a chart of hazard detection likelihood in sequences in accordance with the present disclosure.

FIG. 8 presents the relationship between the timing of two forward glance durations (1 s and 2 s) in an alternating 3 s sequence and the corresponding hazard detection likelihood. When shorter durations are near the end of stages, the detection likelihood is lower. In other words, when drivers take shorter forward glances towards the end of a sequence, there is a negative impact on the detection likelihood. However, shorter durations assigned in the earlier stages does not degrade driver's hazards detection performance. Taken together, the criticality of the longest forward glance increases later on in an alternation sequence, prior to the occurrence of a latent hazard. The difference between different forward glance durations is not significant anymore. For example, the detection probabilities of two alternation sequences with mixed forward glance durations are the same: [2-1 2-3 2-3 2-3] and [2-2 2-3 2-3 2-3]. This is consistent with previous studies that presented a short history of glance behavior as more sensitive to hazards detection.

Variable of Time Window Non Fixed Stages.

Since a long history of forward glance duration is relatively less relevant in the hazard detection process, focus is on the last two stages of hazard detection glance behaviors. Table 2 presents detection likelihood in several scenarios with relaxed time window and stage. In more frequent alternations within an alternation sequence between the inside of the vehicle and the forward roadway, insufficient forward glance durations produce lower probability of the detection than in less frequent task sequences. A sequence [2 s-1 s 2 s-1 s 2 s-1 s 2 s-4 s] with less forward duration presents higher detection likelihood (38.5%) than following sequences:

[2 s-1 s 2 s-1 s 2 s-1 s 2 s-1 s 2 s-4 s]
[2 s-1 s 2 s-1 s 2 s-1 s 2 s-2 s 2 s-4 s]
[2 s-2 s 2 s-2 s 2 s-2 s 2 s-1 s 2 s-4 s]
[2 s-2 s 2 s-2 s 2 s-2 s 2 s-2 s 2 s-4 s] with detection likelihood ranging from 31.0% to 34.8%. This result is indicative that less frequent alternations with longer forward glances within a sequence produce better hazard detection likelihoods.

TABLE 2

Detection likelihood in each sequence that has different orders and stages

| | Each sequence | One or two stages toward end of one experiment attempt. | | | | |
| --- | --- | --- | --- | --- | --- | --- |
| | | [2-1 2-4] | [2-2 2-4] | [2-4] | [2-3 2-4] | [2-4 2-4] |
| Three stages in the front | [2-1 2-1 2-1] | 31.0% | 33.0% | 38.5% | 47.6% | 62.9% |
| | [2-2 2-2 2-2] | 32.6% | 34.8% | 41.5% | 50.0% | 64.3% |
| | [2-3 2-3 2-3] | 44.6% | 48.2% | 58.0% | 67.4% | 75.0% |
| | [2-4 2-4 2-4] | 45.5% | 49.2% | 64.0% | 68.7% | 75.8% |

Having longer than 3 s forward glances in the fourth stage always contributed to a higher probability of hazard detection across different scenarios in the first three stages. For marginal hazard detection greater than 50.0%, at least four alternations of 3 s (out of five) forward glance duration are required (a total of 21 seconds).

Illustrative Example on Four-Way Uncontrolled Intersection.

Figure 9:
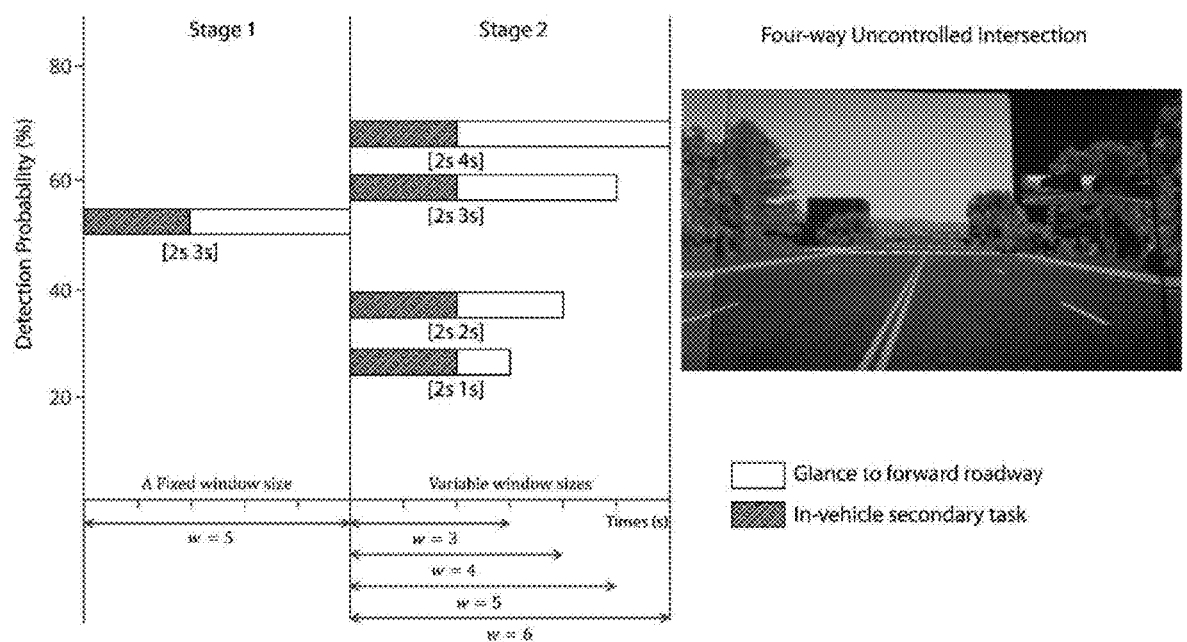
FIG. 9 is a chart showing application of the system of the present disclosure on an intersection scenario.

A four-way uncontrolled intersection scenario is selected for the application of the proposed model. Potential threats are designed to emerge peripherally and the type of information processing in this scenario is top-down, where drivers need to allocate their resources to the threat area. The average speed limit was 30 mph assuming that the driver was maintaining the speed limit. The view to the left and right hand sides of the road is obscured (e.g., by horizontal or vertical curvature). The secondary in-vehicle tasks were initiated from 3 s to 6 s before the location of the potential threat. The perspective view of scenario is described in FIG. 9.

There are two potential sequences of alternating tasks inside and outside of vehicle. First, in the fixed glance duration setup, a scenario has two identical baseline alternation tasks requiring off road glances (2 s) followed by forward glances (3 s) forming an alternation sequence. For simplicity, these top-down cases are expressed as [2 s-3 s 2 s-3 s]. After a total of 5 seconds of first alternation [2 s-3 s], the driver should glance to the left and right of the crossroad to determine if any potential threats exist. On this intersection, without stop sign or traffic signal, the driver has a 57% chance of detecting a hazard. The driver's attention level starts to decrease when the driver looks away from the forward roadway and starts increasing after the driver returns his/her glance towards the forward roadway. The potential latency period of previous studies was not considered in this work (e.g., 0.1 s). After 5 seconds of a subsequent alternation [2 s-3 s], the driver's threat detection likelihood slightly increased to 61%.

Second, in the variable glance duration setup, several scenarios present different forward glances (is, 2 s, 4 s) in the second stage. There is a greater increase in hazard detection probability when the driver has more time to obtain information from the forward roadway [2 s-3 s 2 s-4 s]. However, the attention level depletes quickly when drivers had less than or equal to 2 s to scan for a latent hazard [2 s-3 s 2 s-1 s] [2 s-3 s 2 s-2 s].

As shown herein, the probability of threat detection was estimated in a time series considering how long a driver needs to glance at the forward roadway after performing a secondary, in-vehicle task requiring the driver to alternate his/her glances several times between the inside of the vehicle and the forward roadway. The HMMs in this disclosure allow for the consideration of the time series evolution of latent hazard detection. Inferential statistics with probability of hazard detection were computed from the experimental setting with the hope of unearthing some relevant trends. Three different characteristics of total experiment time were tested in the model. Over a fixed time-window, the difference in detection likelihood between the model and real value was between 5% and 15% margin. The 4-fold cross validation proved that the model possessed comparable accuracy with balanced trade-off between precision and recall. Other modeling efforts evaluating other variables in similar domains reported mean accuracy of 95.24% in a driver behavior capture situation. Over variable time-windows, a different ordering of scenarios was used for each participant. A short history of glance behavior was found to be much more sensitive to latent hazard detection likelihood. With variable time-windows and variable total number of stages, time-windows longer than 3 s in the fourth stage always contributed to a higher detection likelihood across different scenarios in the first three stages.

Figure 10:
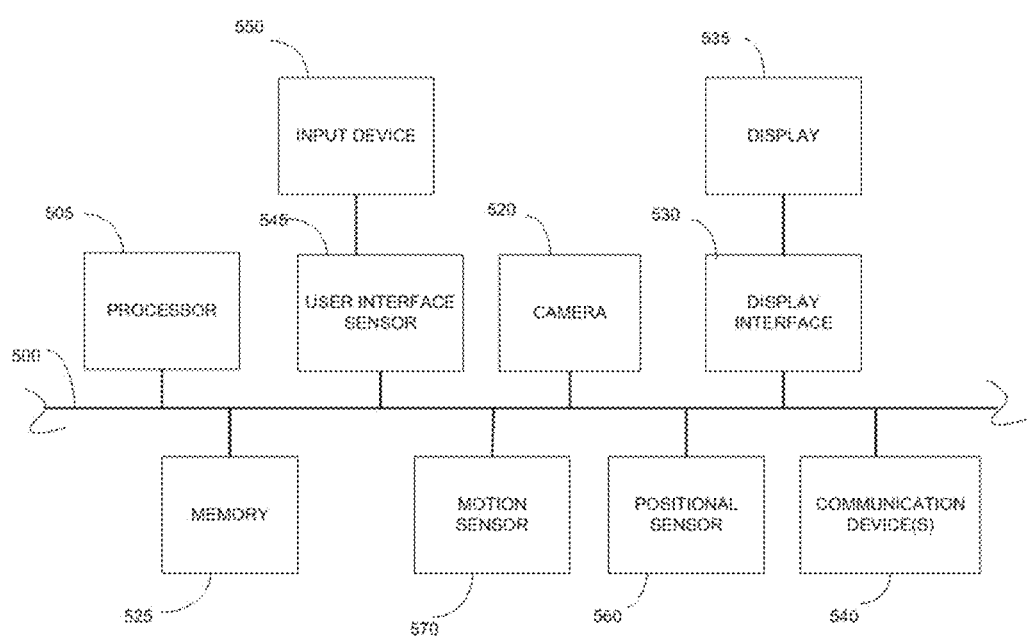
FIG. 10 is block diagram of a computer system in accordance with the present disclosure.

Referring now to FIG. 10, an example of internal hardware that may be included in any of the electronic components of the system 100, such as a computing device in the system 100, is depicted. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a wireless antenna, an RFID tag and/or short-range or near-field communication transceiver, each of which may optionally communicatively connect with other components of the device via one or more communication system. The communication device 540 may be configured to be communicatively connected to a communications network, such as the Internet, a local area network or a cellular telephone data network.

The hardware may also include a user interface sensor 545 that allows for receipt of data from input devices 550 such as a keyboard, a mouse, a joystick, a touchscreen, a touch pad, a remote control, a pointing device and/or microphone. Digital image frames also may be received from a camera 520 that can capture video and/or still images. The system also may include a positional sensor 580 and/or motion sensor 570 to detect position and movement of the device. Examples of motion sensors 570 include gyroscopes or accelerometers. Examples of positional sensors 580 include a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method for determining a probability that a driver will detect a hazard while driving in a current time segment, comprising the steps of:
   retrieving from a memory a previous time segment detection state indicating a detect state wherein the driver was determined to be likely to detect a hazard or a non-detect state wherein the driver was determined to not be likely to detect a hazard;
   detecting and tracking the driver's sequence of forward glance durations and non-forward glance durations in the current time segment;
   categorizing the sequence of forward glance durations and non-forward glance durations in the current time segment into an observation type selected from a group of at least two observation types;
   accessing from the memory a group of previously stored transition matrices;
   selecting a transition matrix from the group of previously stored transition matrices based on the observation type;
   grouping the forward glance durations, non-forward glance durations, and observation type from the current time segment into a tuple;
   determining the probability that the driver will detect a hazard in the current time segment based on the tuple, the previous time segment detection state, and the selected transition matrix;
   storing in the memory a current time segment detection state indicating, based on whether the determined probability is above or below a predetermined threshold, a detect state wherein the driver is determined to be likely to detect a hazard or a non-detect state wherein the driver is determined to not be likely to detect a hazard; and
   alerting the driver if the current time segment detection state is a non-detect state.

2. The method of claim 1 wherein each observation type has a transition matrix unique to that observation type among the group of previously stored transition matrices.

3. The method of claim 1, wherein each transition matrix comprises:

a probability of transitioning from a non-detect state in the previous time segment to a detect state in the current time segment;

a probability of transitioning from a non-detect state in the previous time segment to a non-detect state in the current time segment;

a probability of transitioning from a detect state in the previous time segment to a non-detect state in the current time segment; and a probability of transitioning from a detect state in the previous time segment to a detect state in the current time segment.

4. A system for determining a probability that a driver will detect a hazard while driving in a current time segment comprising:

a memory that stores a previous time segment detection state indicating a detect state wherein the driver was determined to be likely to detect a hazard or a non-detect state wherein the driver was determined to not be likely to detect a hazard;

an eye tracker that detects and tracks the driver's sequence of forward glance durations and non-forward glance durations in the current time segment;

a probability calculator that:
categorizes the sequence of forward glance durations and non-forward glance durations in the current time segment into an observation type selected from a group of at least two observation types;

accesses from the memory a group of previously stored transition matrices;

selects a transition matrix from the group of previously stored transition matrices based on the observation type;

groups the forward glance durations, non-forward glance durations, and observation type from the current time segment into a tuple;

determines the probability that the driver will detect a hazard in the current time segment based on the tuple, the previous time segment detection state, and the selected transition matrix; and stores in the memory a current time segment detection state indicating, based on whether the determined probability is above or below a predetermined threshold, a detect state wherein the driver is determined to be likely to detect a hazard or a non-detect state wherein the driver is determined to not be likely to detect a hazard; and a vehicle alarm that alerts the driver if the current time segment detection state is a non-detect state.

5. The system of claim 4 wherein each observation type has a transition matrix unique to that observation type among the group of previously stored transition matrices.

6. The system of claim 4, wherein each transition matrix comprises:

a probability of transitioning from a non-detect state in the previous time segment to a detect state in the current time segment;

a probability of transitioning from a non-detect state in the previous time segment to a non-detect state in the current time segment;

a probability of transitioning from a detect state in the previous time segment to a non-detect state in the current time segment; and a probability of transitioning from a detect state in the previous time segment to a detect state in the current time segment.

* * * * *